H. A. KOENIG.
COUPLING DEVICE FOR TUBES.
APPLICATION FILED MAR. 4, 1916.
1,203,630.
Patented Nov. 7, 1916.
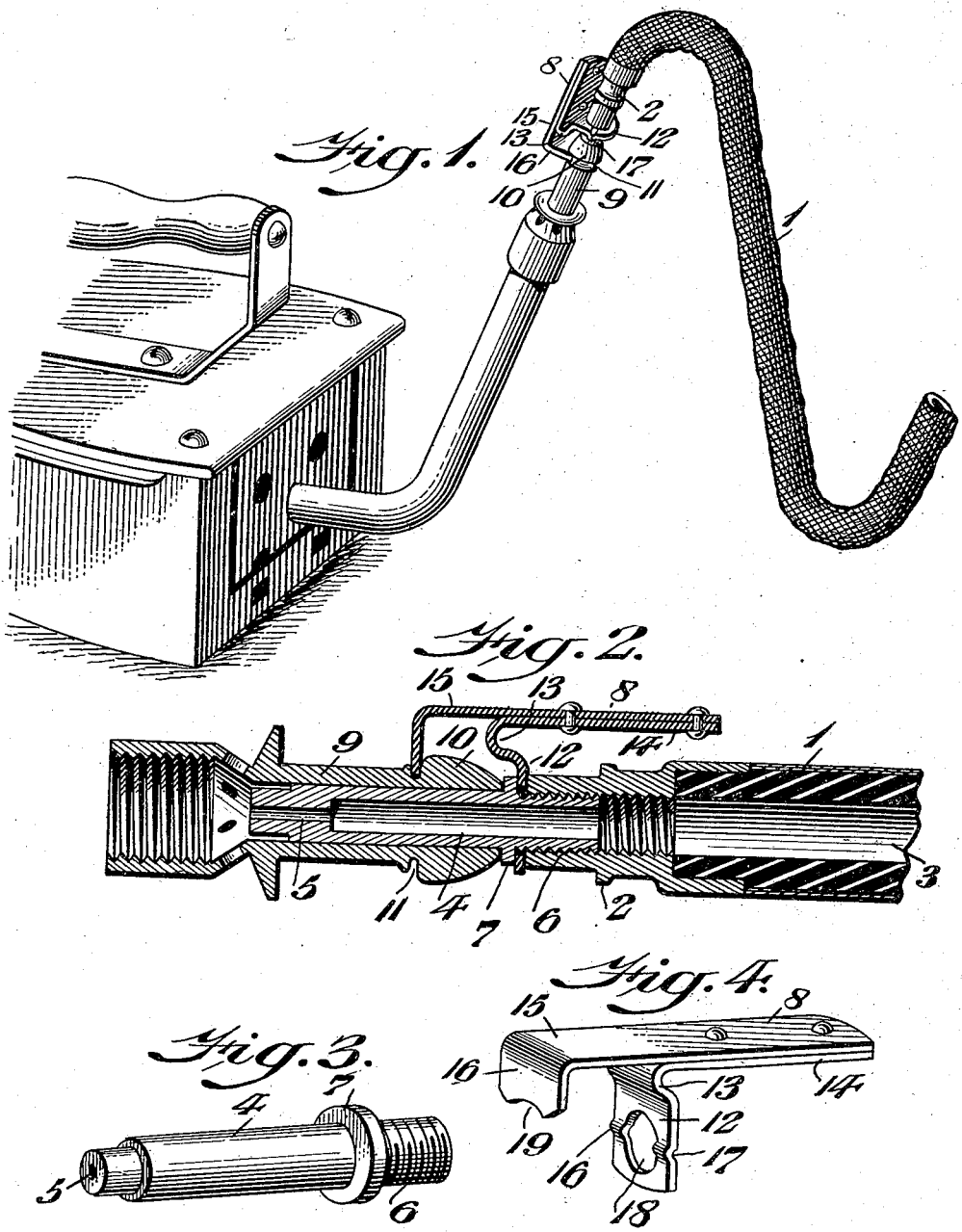

UNITED STATES PATENT OFFICE.

HARRY A. KOENIG, OF PHILADELPHIA, PENNSYLVANIA.

COUPLING DEVICE FOR TUBES.

1,203,630.  Specification of Letters Patent.  Patented Nov. 7, 1916.

Application filed March 4, 1916. Serial No. 82,064.

*To all whom it may concern:*

Be it known that I, HARRY A. KOENIG, a citizen of the United States, residing at Philadelphia, in the county of Philadelphia and State of Pennsylvania, have invented a certain new and useful Coupling Device for Tubes, of which the following is a specification.

My present invention relates to couplings or connecting means for tubes and has reference more particularly to a coupling for detachably joining flexible tubing, such as gas tubing or the like to a coöperating part. Gas conducting tubing of the type more generally employed for use in detachable lengths, as heretofore constructed, is usually supplied with rubber ends or nipples by which the tube is connected both to the gas supply and burner parts by expanding or stretching the nipple in the well known manner. Such couplings or connecting means have proven unsatisfactory, owing to the enlargement of the bore of the nipple through constant use, whereby the tube either slips off entirely and allows the gas to escape or has such a loose connection that leakage occurs. A further disadvantage of this type of tube is that the burner pipe to which the tube is connected becomes so heated as to burn and rot or destroy the rubber. In either of the foregoing instances, the user is subjected either to the odor of escaping gas, burning rubber and sometimes to both.

It is an object of my invention to provide a coupling or connector, whereby the foregoing disadvantages are eliminated and to maintain all the advantages of a detachable tubing without bringing any rubber or fabric parts into contact with the hot metal.

A further object is to provide a coupling which is simple in construction, positive in operation and effective to prevent leakage of gas at the joint between the parts.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1 represents a perspective of the coupling embodying my invention shown in operative position joining a gas tube to the burner pipe of a gas iron. Fig. 2 represents a longitudinal section of said coupling and its associated parts. Fig. 3 represents a perspective of the nozzle. Fig. 4 represents a perspective of the locking clip.

1 designates a gas tube of ordinary flexible construction, either of fabric or metal as the case may be and which in accordance with my preferred construction has an end provided with an internally threaded nipple 2 which is fixed thereto in any well known manner and forms a part thereof and the bore of which is a continuation of the bore of the gas conduit 3.

4 designates a nozzle having a relatively long body part which terminates in a gas discharge outlet 5 of proper size to feed the required quantity of gas to the burner. The end 6 of the nozzle is adapted for screw-threaded engagement with the nipple 2 in order to connect the one part to the other as will be readily understood. Intermediate the length of the nozzle, I preferably provide a flange 7 which in the present construction performs a double function, first serving, when drawn tight by the screw-threads, as a clamp to fix the locking clip 8 in position and second to substantially seal the joint between the nozzle 4 and the union-head 9. In the present instance, the union-head 9 has a truncated end portion 10 provided with a suitable groove 11 at its base to receive the fastening or locking part of the clip. This groove preferably extends around the union-head forming a continuous channel so that the clip and its attached tube may be turned freely relative to the head. This construction prevents twisting of the tube with its attendant results, such as breaking or splitting of the tube and the like.

12 designates the apertured end portion of a strip of spring material which is formed with a suitable offset 13 joining the body 14 of the said strip. This body 14 preferably extends at substantially right angles to the end 12 and thus parallels the tube proper, though being sufficiently removed therefrom to provide a clearance to permit proper operation of the clip. The locking part of the clip consists of the strip 15 which is riveted or otherwise fixed to the body 14 and has one end 16 bent at a suitable angle to interengage with the groove 11 of the head 9. That is to say, the spring member 14 normally holds the strip 15 in position to lock with the head 9 and hold the parts together.

In Fig. 2, the coupling is shown in operative position locking the parts in alined relation and they are thus held fast and secure until it is desired to release one from the other. The unlocking operation may be accomplished by a relatively slight pressure upon the free end of the clip body and in this connection, it will be noted that this free end has a comparatively long leverage with respect to the fulcrum while the locking end has a comparatively short leverage. This contributes to ease of manual operation and holds the parts securely locked. The end 12 is preferably formed with ridges 17 adjacent the opening 18 for the purpose of interposing a yielding or spring-like formation between the flange 7 and nipple 2 and which thereby serves substantially like a nut-lock to prevent the disconnection of the threaded parts.

It will be noted that while I have preferred to provide the end 12 with an opening through which the threaded part 6 of the nozzle is adapted to pass, I do not wish to be limited to such exact construction, as obviously, various equivalent means may be employed to the same end.

In view of the fact that I prefer to form the end 16 of the clip with a curved portion 19 which follows the contour of the groove 11, it will be evident that the clip may ride the more easily in the groove when turned in one direction or the other. The end 16 serves as a jaw which is normally under the spring tension of the clip when in engagement with the head 9 and therefore grips or clamps the coöperating part firmly and resists any force tending to separate the parts unless applied at the end of the relatively long lever arm.

It will be apparent that the nozzle and head may be readily locked by simply pressing the one part into the other and causing the jaw 16 to ride up and over the head 9 when it automatically snaps back of the shoulder formed on the head by the groove 11.

It will now be apparent that I have devised a complete unitary structure whereby a gas or like tube may be instantly attached to or detached from a burner, pipe or like member, so that in operative position of the parts, the tube is effectually locked and prevents leakage, while in inoperative position, the parts are entirely disconnected and the danger of leaving the burner in operation is eliminated.

What I claim is:

1. In a device of the character stated, a nipple adapted to be secured to a tube, a nozzle having threaded engagement with said nipple and provided with a flange adjacent the threaded portion, a spring clip having means adapted to be clamped between said flange and nipple to hold said clip in operative position, a union-head adapted to receive said nozzle and having a shouldered portion and a jaw part on said clip for engagement with said shouldered part.

2. In a device of the character stated, a body of spring material provided with a supporting part arranged at an angle thereto and having an opening therein, said body part also having an offset to provide spring action and an extension secured to said body having a locking jaw integral therewith.

3. In a device of the character stated, a body of spring material provided with a supporting part, a nipple, means to attach said supporting part to said nipple, a nozzle, a union head for receiving said nozzle provided with a shoulder and an extension on said spring body having a jaw adapted to flex to engage said shoulder, whereby said parts are interlocked.

In testimony whereof, I have hereunto signed my name.

HARRY A. KOENIG.

Witnesses:
 ROBERT M. BARR,
 WM. J. JACKSON.